United States Patent
Sasaki et al.

(10) Patent No.: US 9,253,424 B2
(45) Date of Patent: Feb. 2, 2016

(54) IMAGE PROCESSING APPARATUS AND CONTROL METHOD THEREOF

(71) Applicant: CANON KABUSHIKI KAISHA, Tokyo (JP)

(72) Inventors: Ken Sasaki, Tokyo (JP); Satoshi Suzuki, Tokyo (JP)

(73) Assignee: CANON KABUSHIKI KAISHA, TOKYO (JP)

( * ) Notice: Subject to any disclaimer, the term of this patent is extended or adjusted under 35 U.S.C. 154(b) by 0 days.

(21) Appl. No.: 14/480,018

(22) Filed: Sep. 8, 2014

(65) Prior Publication Data

US 2015/0070536 A1    Mar. 12, 2015

(30) Foreign Application Priority Data

Sep. 12, 2013  (JP) .................................. 2013-189848

(51) Int. Cl.
*H04N 5/217*   (2011.01)
*H04N 5/367*   (2011.01)
*H04N 9/04*    (2006.01)

(52) U.S. Cl.
CPC ............... *H04N 5/367* (2013.01); *H04N 9/045* (2013.01)

(58) Field of Classification Search
CPC ....... H04N 5/367; H04N 5/217; H04N 9/045; H04N 5/2176
See application file for complete search history.

(56) References Cited

U.S. PATENT DOCUMENTS

| 7,936,392 B2* | 5/2011 | Ng ..................... G02B 27/0075 348/349 |
| 8,743,245 B2* | 6/2014 | Hiasa ................. H04N 13/0011 250/201.2 |
| 2011/0090371 A1* | 4/2011 | Cote .................... H04N 5/2176 348/237 |

FOREIGN PATENT DOCUMENTS

JP    2005-286825 A    10/2005

OTHER PUBLICATIONS

Ren NG et al.,"Light Field Photography with a Hand-Held Plenoptic Camera", Stanford Tech Report CTSR Feb. 2005.

* cited by examiner

*Primary Examiner* — Tuan Ho
(74) *Attorney, Agent, or Firm* — Cowan, Liebowitz & Latman, P.C.

(57) ABSTRACT

An image processing apparatus which processes a captured image including angle information of a light beam traveling from the object, comprises a generation unit configured to generate a reconstructed image by reconstructing the captured image, an extraction unit configured to extract an address of a defective photoelectric conversion element which is included in photoelectric conversion elements which captured the captured image based on a plurality of reconstructed images corresponding to different imaging distances.

8 Claims, 10 Drawing Sheets

F I G. 10
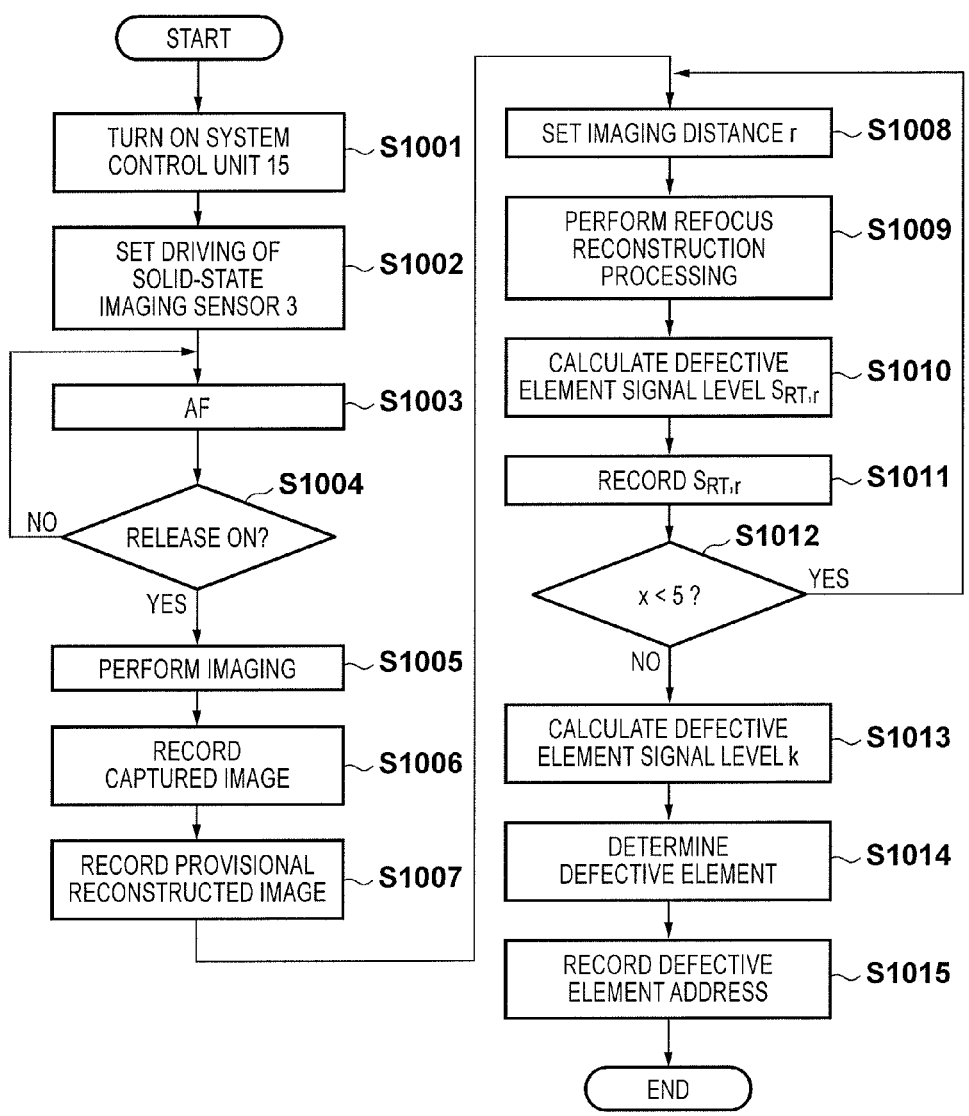

IMAGE PROCESSING APPARATUS AND CONTROL METHOD THEREOF

BACKGROUND OF THE INVENTION

1. Field of the Invention

The present invention relates to an image processing apparatus, more particularly, to an image processing apparatus which detects and corrects a defect, and control method thereof.

2. Description of the Related Art

In a recent digital image processing technique, the progress in a field of study called light field photography is significant. In light field photography, first, an image is captured so that a captured image obtained from an image capturing apparatus including an imaging optical system such as a lens, and a solid-state imaging sensor such as a CCD or CMOS sensor includes not only two-dimensional light intensity information of the object field, but also light beam angle information.

The captured image including the light beam angle information is equivalent to division into a considerable number of pupils exceeding division into a pair of pupils in so-called phase difference autofocus detection (AF). This captured image is data not always having the list and order of pieces of significant information when the image is directly observed. To solve this, there have been proposed an image capturing apparatus and image processing apparatus capable of focusing again (to be also referred to as refocusing) on an arbitrary object in the object field after imaging by performing reconstruction image processing closely related to an image capturing process in which the captured image was obtained.

An example of this image capturing apparatus and image processing apparatus is a hand-held plenoptic camera (to be also referred to as a light field camera hereinafter) described in literature 1 "Ren. Ng, et al., 'Light Field Photography with a Hand-Held Plenoptic Camera', Stanford Tech Report CTSR 2005-02". The building components of the light field camera are as follows: a "main lens", which is an imaging optical system in a well-known image capturing apparatus, forms mainly an object image on a "microlens" array having a predetermined pitch. A "solid-state imaging sensor" including photoelectric conversion elements at a smaller pitch than the predetermined pitch is arranged behind the microlens array.

In other words, by a special image capturing process and image processing premised on this, the light field camera described in literature 1 obtains an image having new information which has not been obtained by a well-known image capturing apparatus.

To the contrary, most image processes which are performed in a conventionally well-known image capturing apparatus are executed on the assumption that the signals of photoelectric conversion elements, which constitute a captured image, have continuity to some extent. An example is a real-time defective pixel detection method of determining a defective pixel from a level difference from the signal of a surrounding photoelectric conversion element in every imaging by the image capturing apparatus.

For example, Japanese Patent Laid-Open No. 2005-286825 discloses a defective pixel correction apparatus characterized by comprising a first defective pixel detection unit configured to detect a defective pixel by comparing, with a predetermined value, each of signals output from a plurality of pixels, a first correction unit configured to correct a signal from the defective pixel detected by the first defective pixel detection unit, a second defective pixel detection unit configured to detect a defective pixel by comparing, with a predetermined value, each of signals output from the plurality of pixels in which correction has been performed on the defective pixel detected by the first defective pixel detection unit, and a setting control unit configured to set the predetermined values to be different from each other in the first defective pixel detection unit and the second defective pixel detection unit.

Japanese Patent Laid-Open No. 2005-286825 also discloses that information of a defective pixel detected by the first defective pixel detection unit is recorded, and the second defective pixel detection unit refers to even the defective pixel information in the first defective pixel detection unit. Further, Japanese Patent Laid-Open No. 2005-286825 describes that it is determined whether the detected pixel is actually a defective pixel or an object edge, and if the detected pixel is considered to be an object edge, no correction is performed to prevent degradation of the image quality.

Real-time defective pixel detection is especially effective to suppress degradation of the image quality accompanying a subsequent defective pixel which has not been recorded in the memory of the image capturing apparatus or the like, or a flickering defective pixel whose output level varies in every imaging. However, the most important task in the real-time defective pixel detection method is discrimination between a defective pixel which should be a correction target, and an object edge.

In a well-known image capturing apparatus, a unit element constituting a captured image is generally called a "pixel". It has not been necessary to definitely discriminate the "signal of a photoelectric conversion element" serving as a unit element constituting a solid-state imaging sensor, and the "pixel" serving as a unit element constituting a final image having undergone signal processing. In the light field camera, however, they are concepts which should be definitely discriminated.

As described above, to obtain a significant feature such as refocus reconstruction processing, a special image capturing process as mentioned above occupies an important position in the light field camera. The special image capturing process means simultaneous acquisition of light intensity information and light beam angle information. The light beam angle information appears in the intensity distribution of many photoelectric conversion elements corresponding to one microlens. At this time, there is an image shift in which the intensity distribution of the signals of a plurality of photoelectric conversion elements shifts in accordance with the distance to an object and focusing of the imaging optical system. The image shift is a phenomenon in which a coordinate shift occurs in images constituted by the signals of photoelectric conversion elements belonging to the same quadrant of microlenses. The image shift is regarded as expansion of a shift between a pair of images to a shift between many images in phase difference detection AF.

More specifically, a captured image obtained by arranging the signals of many photoelectric conversion elements in the output order of the solid-state imaging sensor without performing any refocus reconstruction processing is data not suitable for direct observation. It is therefore difficult to accomplish the task of discriminating an object edge and a defective pixel by only applying, to a captured image including light beam angle information, the aforementioned real-time defective pixel detection method which assumes that the signals of photoelectric conversion elements have continuity to some extent. In the light field camera, the address of a pixel in a reconstructed image that may be influenced by the signal of a defective photoelectric conversion element (to be also referred to as a defective element hereinafter) changes upon every refocusing in refocus reconstruction processing.

For this reason, to suppress degradation of the image quality accompanying a defective element in the light field camera, it is necessary to perform real-time defective pixel detection on a reconstructed image upon every refocus reconstruction processing, and further correct the detected defective pixel. However, real-time defective pixel detection takes the processing time to scan a reconstructed image. This means that much time is taken until a reconstructed image is displayed after an operation of focusing again on an arbitrary object in the object field of a captured image. The user may feel uncomfortable.

SUMMARY OF THE INVENTION

The present invention has been made to solve the above-described problems, and provides an image processing apparatus capable of efficiently obtaining a refocused/reconstructed image in which degradation of the image quality accompanying a defective element is suppressed.

According to the first aspect of the present invention, there is provided an image processing apparatus which processes a captured image including angle information of a light beam traveling from the object, comprising: a generation unit configured to generate a reconstructed image by reconstructing the captured image; an extraction unit configured to extract an address of a defective photoelectric conversion element which is included in photoelectric conversion elements which captured the captured image based on a plurality of reconstructed images corresponding to different imaging distances.

According to the second aspect of the present invention, there is provided a method of controlling an image processing apparatus which processes a captured image including angle information of a light beam traveling from the object, comprising: a generation step of generating a reconstructed image by reconstructing the captured image; an extraction step of extracting an address of a defective photoelectric conversion element which is included in photoelectric conversion elements which captured the captured image based on a plurality of reconstructed images corresponding to different imaging distances.

Further features of the present invention will become apparent from the following description of exemplary embodiments with reference to the attached drawings.

BRIEF DESCRIPTION OF THE DRAWINGS

FIG. 10 is a flowchart showing a method of controlling an image capturing apparatus according to the third embodiment of the present invention.

DESCRIPTION OF THE EMBODIMENTS

Embodiments of the present invention will now be described in detail with reference to the accompanying drawings. Terms used in the embodiments of the present invention will be defined. A unit element constituting a "captured image (including light beam angle information)" in a light field camera will be called the "signal of a photoelectric conversion element" or simply an "element". A unit element constituting a "reconstructed image" obtained by any refocus reconstruction processing will be called a "pixel".

First Embodiment

Figure 1:
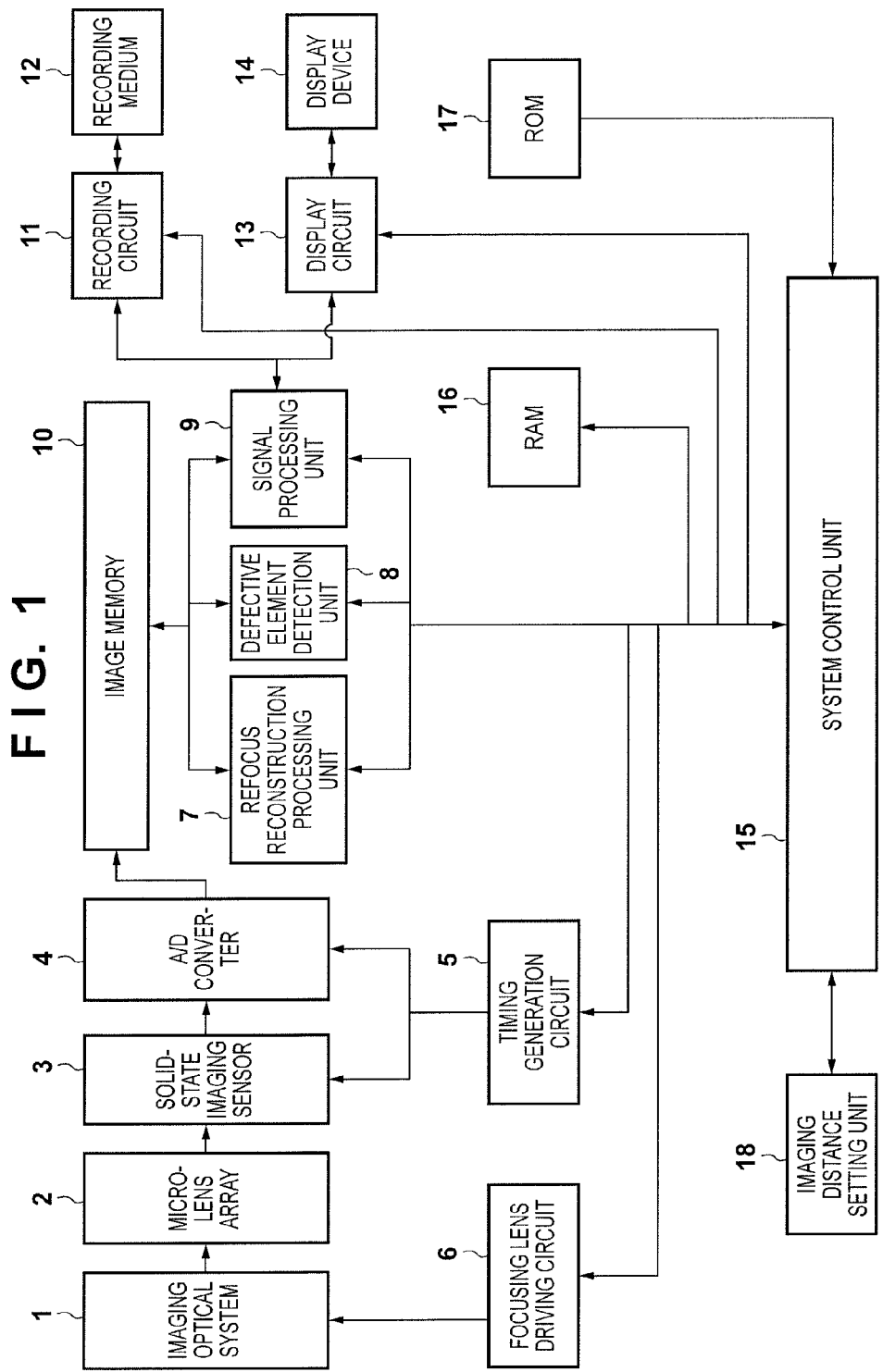
FIG. 1 is a block diagram showing the arrangement of an image capturing apparatus according to the first embodiment of the present invention.

FIG. 1 is a block diagram showing the overall arrangement of an image capturing apparatus according to the first embodiment of the present invention. In FIG. 1, an imaging optical system 1 includes a stop and focusing lens, and forms the optical image of an object. Microlens arrays 2 form images of an object through the focusing lens of the imaging optical system 1 at mainly their vertices. The microlens arrays 2 are two-dimensionally arrayed at a predetermined pitch in the horizontal and vertical directions. A solid-state imaging sensor 3 photoelectrically converts an object image formed by the imaging optical system 1, and extracts it as an electrical signal. The solid-state imaging sensor 3 has the function of a photoelectric conversion element that is implemented by pixels two-dimensionally arranged in the horizontal and vertical directions at a pitch smaller than the pitch of the microlens arrays 2. The solid-state imaging sensor 3 also has a signal transfer function of transferring an electrical signal from the photoelectric conversion element as a captured image.

An A/D converter 4 converts a sampled analog signal into a digital signal. A digital captured image is recorded in an image memory 10. If necessary, a refocus reconstruction processing unit 7 performs refocus reconstruction processing, which is a feature of the light field camera. A defective pixel detection unit 8 performs real-time defective pixel detection on a reconstructed image having undergone necessary refocus reconstruction processing. More specifically, the defective pixel detection unit 8 determines whether each pixel constituting a reconstructed image is a defect, and specifies a defective pixel which should be a correction target. A signal processing unit 9 performs various signal processes such as defective pixel correction, white balance correction, and gamma correction based on the result of real-time defective pixel detection. A final image having undergone various signal processes is recorded on a recording medium 12. A recording circuit 11 is an interface circuit with the recording medium 12. The final image having undergone various signal processes can also be directly displayed on an image display device 14 such as a liquid crystal display via a display circuit (interface circuit) 13. The image display device 14 is also capable of live view display of successively live-displaying frames to be captured now, and playback display of a recorded moving image.

A timing generation circuit 5 drives an image capturing system such as the solid-state imaging sensor 3. Further, the timing generation circuit 5 drives/controls the A/D converter 4 in synchronism with driving of the image capturing system and an output signal from the solid-state imaging sensor 3. Note that the A/D converter 4 may be mounted in the solid-state imaging sensor 3. In this case, a captured image can be recorded directly in the image memory 10.

A focusing lens driving circuit 6 drives the focusing lens of the imaging optical system 1. The focusing lens is used to focus on an object even in a well-known image capturing apparatus other than the light field camera. The focusing lens is controlled by the autofocus detection (AF) function or the like, and determines the imaging position of the imaging optical system 1. A system control unit 15 controls the overall image capturing apparatus in accordance with a program temporarily recorded in a volatile memory 16.

An imaging distance setting unit 18 is a part which sets an imaging distance as a parameter for executing refocus reconstruction processing specific to the light field camera. The light field camera enables focusing after imaging to, for example, focus again on another object by reflecting the AF result and controlling the focusing lens driving circuit 6. At this time, the imaging distance setting unit 18 selects an object distance or object itself, and gives a new imaging distance. A feature of the first embodiment is associated with a special image capturing process in the light field camera, and even refocus reconstruction processing that is closely related to the special image capturing process. The feature will be explained in more detail below.

A nonvolatile memory 17 stores programs, various data, and the like to be transferred in execution of processing by the image capturing apparatus. The nonvolatile memory 17 may record the coordinates of a defect with respect to the signal of a photoelectric conversion element that is not the detection target of the defective pixel detection unit 8 and constitutes a captured image.

Figure 2:
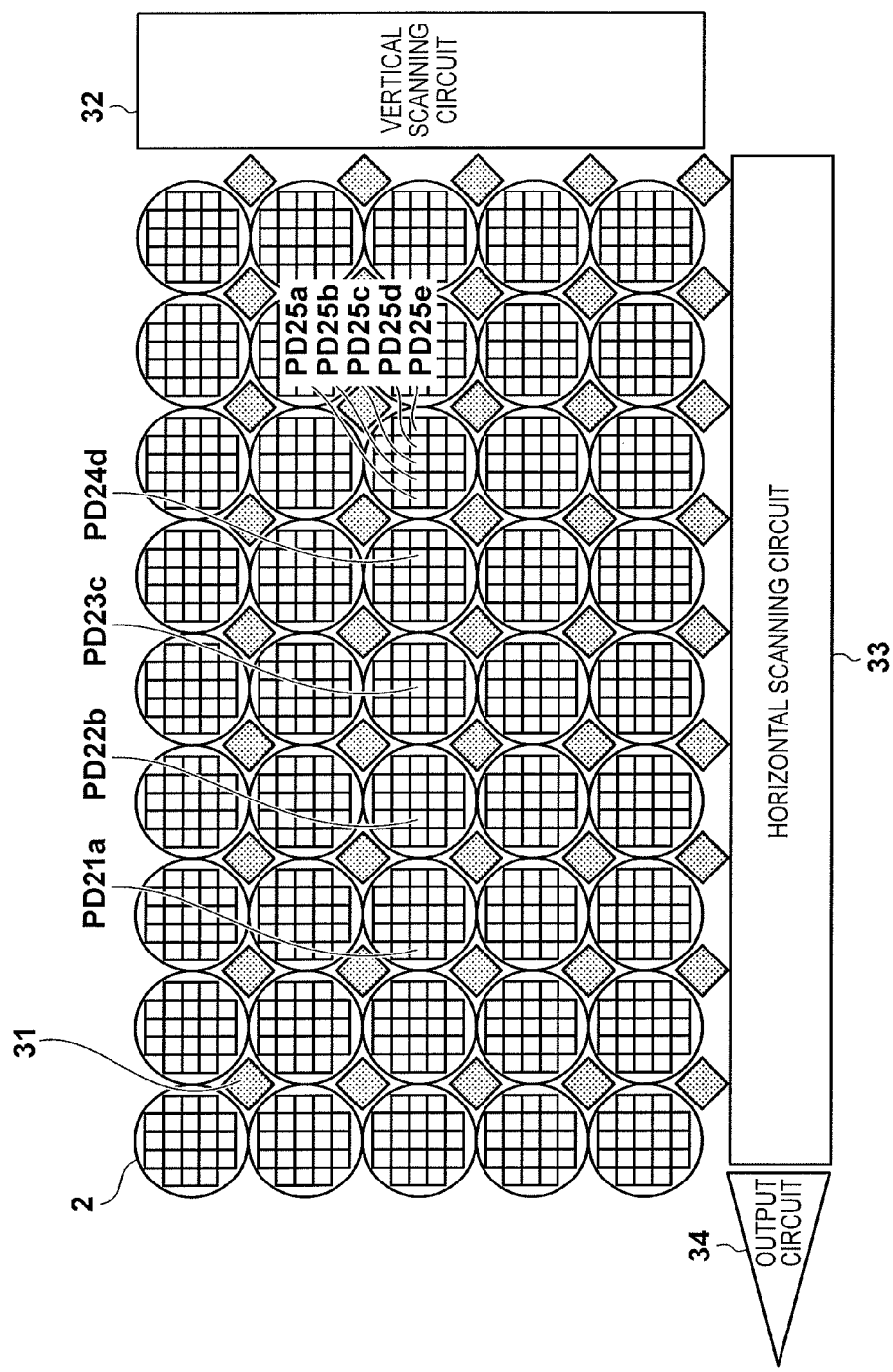
FIG. 2 is a plan view showing the light receiving region of a solid-state imaging sensor.

FIG. 2 is a plan view showing the arrangement of the light receiving region of the solid-state imaging sensor 3. As an example, FIG. 2 shows the numbers of microlens arrays 2 and photoelectric conversion elements, and the arrangement relationship between them. However, it is only necessary that at least a plurality of photoelectric conversion elements correspond to one microlens. Note that the number of photoelectric conversion elements is equivalent to the resolution of an image shift, the resolution of pupil division, and the resolution of light beam angle information. It is known that an increase in the number of photoelectric conversion elements contributes to the accuracy of refocus reconstruction processing and the like. On the other hand, the resolution of a reconstructed image is related to the number of microlenses. Thus, one of tasks of the solid-state imaging sensor 3 is to mount a sufficient number of photoelectric conversion elements for ensuring the accuracy of refocus reconstruction processing while maintaining the resolution.

In FIG. 2, reference symbol PD denotes a photoelectric conversion element. The unit microlens array 2 corresponds to 21 photoelectric conversion elements to contain them inside. The photoelectric conversion element is constituted by forming an n-type semiconductor layer on a p-type semiconductor substrate or p-type well structure by ion implantation or the like. The photoelectric conversion elements are electrically divided from all adjacent photoelectric conversion elements by p-type semiconductor regions. By independently reading out signals from the photoelectric conversion elements, light beam angle information representing the configuration of the light field camera is obtained. To read out the charge signal of the photoelectric conversion element, it is considered to use, for example, a charge transfer CCD, or an APS (Active Pixel Sensor)-CMOS sensor in which an amplification function is given for each pixel and a voltage signal is output. The solid-state imaging sensor in FIG. 2 is, for example, an APS-CMOS sensor. Readout circuit units 31 having the amplification function are formed using dead spaces between the photoelectric conversion elements.

Although not shown in FIG. 2, the readout circuit units 31 are connected to common wiring lines also called vertical output lines in the vertical direction in FIG. 2. A horizontal scanning circuit 33 executes a horizontal transfer function of accessing the common wiring lines sequentially in the horizontal direction.

Although not shown in FIG. 2, the readout circuit units 31 are connected to common control lines in the horizontal direction to execute transfer of signal charges from photoelectric conversion elements on a row at once, charge-voltage conversion by the readout circuit unit 31, and the like. A vertical scanning circuit 32 has a function of setting, sequentially in the row direction, a row which is to perform this operation.

By variously exploiting the function of the above-described APS-CMOS solid-state imaging sensor, random access to a given photoelectric conversion element becomes partially possible. To achieve this, however, the function of a scanning circuit system needs to be added, which influences the cost. Therefore, many APS-CMOS solid-state imaging sensors perform sequential signal readout in the vertical and horizontal directions. More specifically, the signals of photoelectric conversion elements are variously arranged as various light beam angle components in a captured image not to undergo any refocus reconstruction processing. This makes it difficult to discriminate a defective element which should be a correction target and an object edge even if real-time defective pixel detection is tried to be performed directly on a captured image.

Defect generation factors of the solid-state imaging sensor 3 will be explained below though it is difficult to exemplify all factors. A typical factor is a point defect which shines white and is generated by mixture of an impurity such as heavy metal contamination in the photoelectric conversion element itself. Another example of a defect arises from the readout circuit unit 31. This defect is a blinking defect which is generated when the interface level density increases near the surface of a semiconductor layer included in the readout circuit unit 31 owing to the damage of a semiconductor manufacturing step, and charges are trapped or emitted at this level. This is also called RTS noise. A defect of this type is stochastically generated in the time direction, and stands out especially when the same scene of a moving image is viewed. Even in a still image, this defect appears as a phenomenon in which a defect not appearing in a given captured image appears in another captured image. In terms of the arrangement of the image capturing apparatus, it is not efficient to record, in a memory or the like, the defect as a defective element which is always corrected. Recently, in some examples, a plurality of photoelectric conversion elements share the readout circuit unit 31 for miniaturization of the pixel region though it depends on the arrangement of the solid-state imaging sensor 3. In such a case, all photoelectric conversion elements using the readout circuit unit 31 suffering a high interface level density become defective element candidates. From the viewpoint of even the correction image quality, it is not desirable to record all these photoelectric conversion elements as correction targets without exception.

Figure 3:
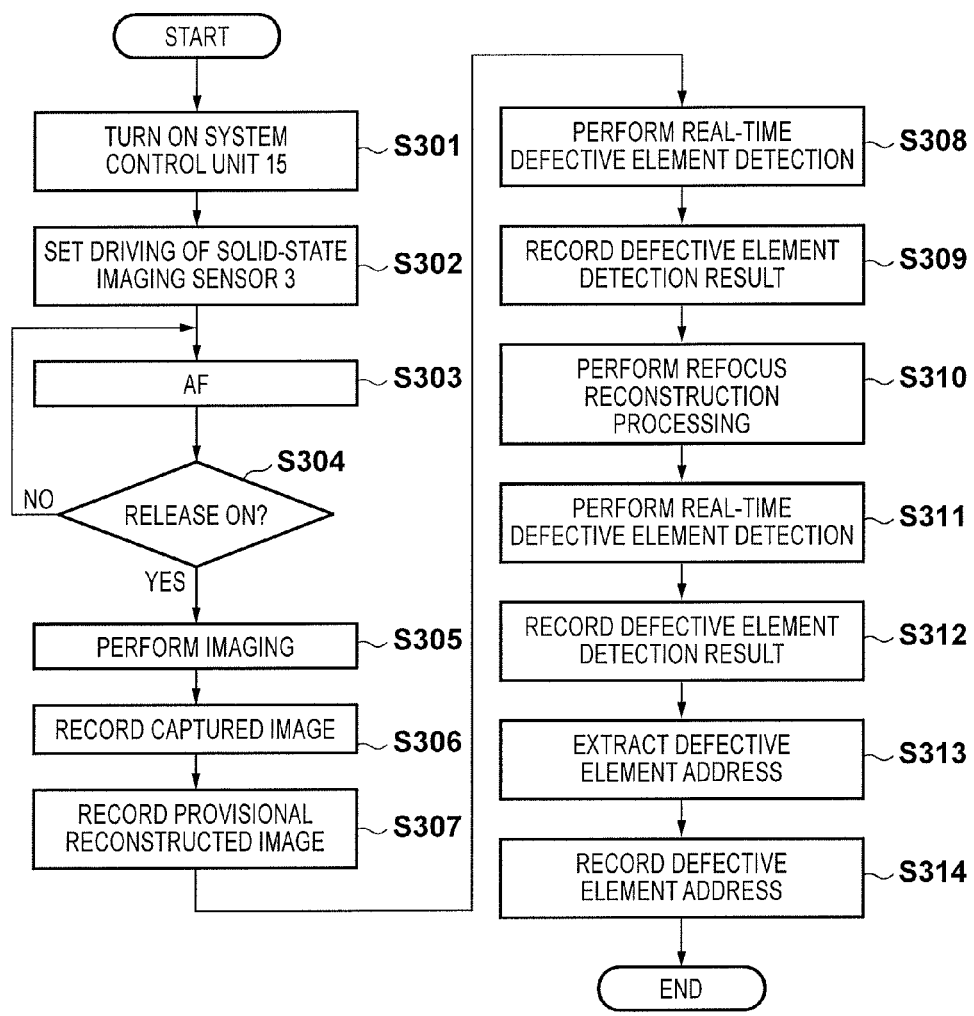
FIG. 3 is a flowchart showing a method of controlling the image capturing apparatus according to the first embodiment.

FIG. 3 is a flowchart showing a method of controlling the image capturing apparatus according to the first embodiment.

The main power supply of the image capturing apparatus is turned on with a switch not shown in FIG. 1, and then the power supply of the system control unit 15 is turned on (step S301). A driving setting signal is supplied to the solid-state imaging sensor 3 (step S302). This makes it possible to execute a mode in which live images are successively displayed on the image display device 14.

Automatic focus adjustment, that is, so-called autofocus (AF) starts to automatically drive the focusing lens so as to focus on an object (step S303). As the AF method, a method using contrast detection, and a method using a dedicated distance measurement sensor are known. If the signals of photoelectric conversion elements in different quadrants below the microlens can be appropriately read out by utilizing the feature of the light field camera according to the first embodiment, they can be used as signals for phase difference detection AF. Upon receiving the AF result, the system control unit 15 drives the focusing lens of the imaging optical system 1 via the focusing lens driving circuit 6.

If a release button not shown in FIG. 1 is pressed (step S304), imaging is executed (step S305). An image read out up to the image memory 10 is recorded as a captured image on the recording medium 12 (step S306). Further, the signals of photoelectric conversion elements below the same microlens are added, and a provisional reconstructed image having the number of pixels corresponding to the microlens arrays 2 is recorded on the recording medium 12 (step S307). Details of the provisional reconstructed image will be explained later.

In steps S308 to S314, processing of extracting a defective element in the recorded captured image and recording the address of the defective element is performed. However, steps S308 to S314 are a kind of preparation processing for, when the user views a reconstructed image, efficiently displaying a reconstructed image in which degradation of the image quality accompanying a defective element is suppressed. Hence, the processes in step S308 and subsequent steps need not always be performed immediately after acquiring a captured image. The processes in step S308 and subsequent steps may be executed by a computer or the like using an image processing apparatus which imitates part of the image capturing apparatus in FIG. 1, a memory which records the image processing method, or the like.

Prior to a description of steps S308 to S314, refocus reconstruction processing will be explained with reference to FIG. 4. A feature of the refocus reconstruction processing resides in rearrangement and addition of the signals of photoelectric conversion elements in consideration of light beam angle information.

Figure 4:
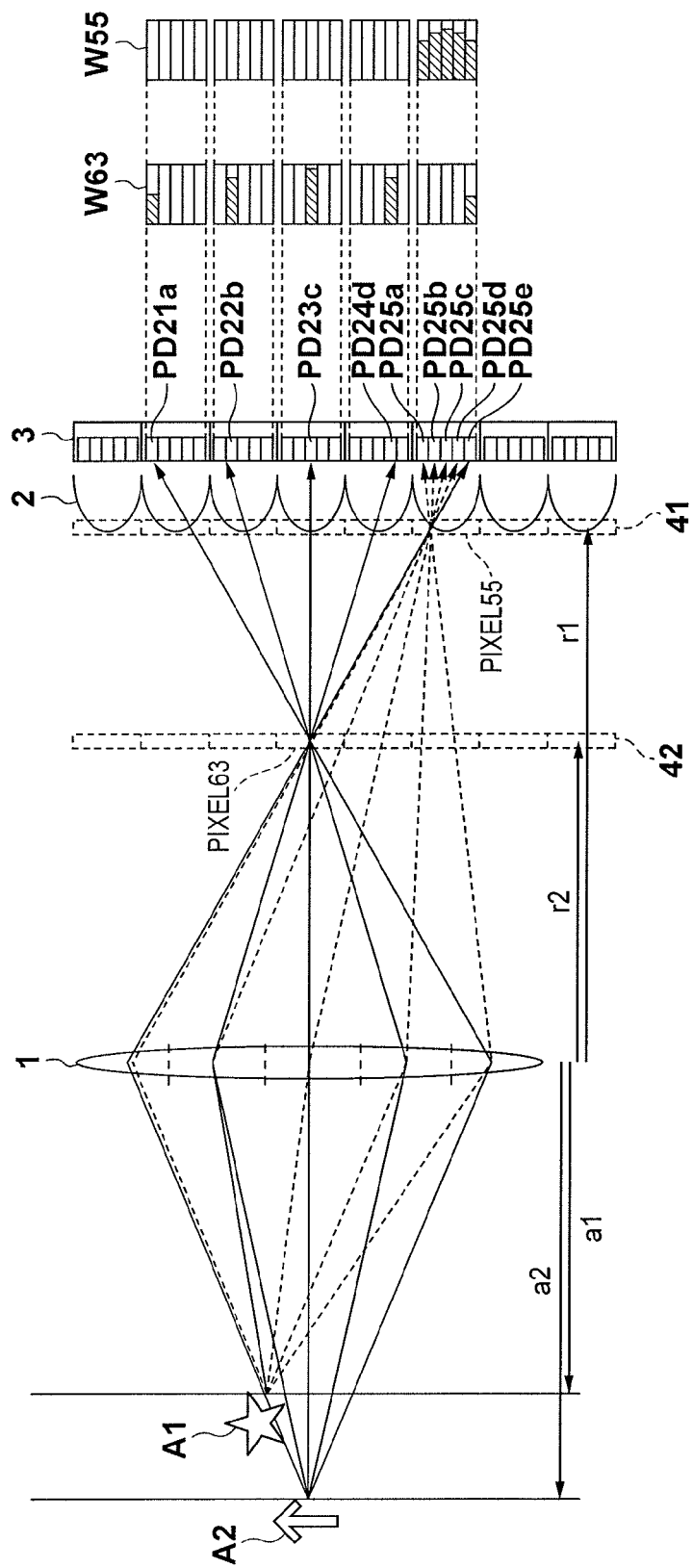
FIG. 4 is a light beam view for explaining refocus reconstruction processing.

FIG. 4 is a light beam view showing a state in which the image capturing apparatus according to the first embodiment forms the image of an object A1 at almost the vertex of each microlens array 2. FIG. 4 shows only principal light beams entering the elements.

In FIG. 4, imaging is performed in a state in which the imaging optical system 1 focuses on the object A1 at an object distance a1 from the principal point. Light beams emerging from one point constituting A1 are converged to one of vertices on the microlens arrays 2 at an imaging distance r1 from the principal point of the imaging optical system 1. Note that imaging formula (1) is established between the object distance a1 and the imaging distance r1:

$$1/a1 + 1/r1 = 1/f \quad (1)$$

where f is the focal length of the imaging optical system 1. The respective light beams enter photoelectric conversion elements PD25a, PD25b, PD25c, PD25d, and PD25e of the solid-state imaging sensor 3 arranged behind the microlens array 2. The signals of these five photoelectric conversion elements have different pieces of angle information of light beams, out of light beams emerging toward the imaging optical system 1 from one point constituting the object A1, which is understood by tracing back to the origin. These five signals are added, to be more accurate, are multiplied by a weighting coefficient corresponding to the imaging distance r1 and then added, obtaining the signal of a pixel 55 of a reconstructed image 41. The above-described provisional reconstructed image is the reconstructed image 41 obtained in this manner.

An example in which refocus reconstruction processing is performed by targeting an object A2 in FIG. 4 will be explained. Apparently from consideration from equation (1), light beams emerging from one point constituting the object A2 present at an object distance a2 from the principal point of the imaging optical system 1 are converged to an imaging distance r2 closer to the imaging optical system 1 than r1. These light beams enter photoelectric conversion elements PD21a, PD22b, PD23c, PD24d, and PD25e present behind different microlenses. For example, a light beam entering PD23c is a light beam angle component having passed through the optical axis of the imaging optical system 1. Light beams entering PD21a and PD25e are light beam angle components having passed through aperture ends of the stop of the imaging optical system 1. Light beams entering PD22b and PD24d are intermediate light beam angle components. PD23c is a center quadrant among photoelectric conversion elements present behind the microlenses. PD21a and PD25e are most end quadrants. PD22b and PD24d are intermediate quadrants.

Note that reference numerals (for example, 21a and 22b) regarding reference symbol PD used in the above description correspond to those in the plan view of the solid-state imaging sensor 3 in FIG. 2. Reference numerals regarding reference symbol PD on the horizontal line of the solid-state imaging sensor 3 in FIG. 2 can be considered to be the same as those on a row of photoelectric conversion elements on one line that are arranged in the image height direction shown in the light beam view of FIG. 4.

As for an object out of the focus of the imaging optical system 1, like the object A2, light beams emerging from one point constituting the object are photoelectrically converted in different quadrants of different microlenses in accordance with angle information. For this reason, the signals of photoelectric conversion elements adjacent to PD21a, PD22b, PD23c, PD24d, and PD25e are light beams of different angle components emerging from another point constituting the object A2. In other words, there is a feature in which an image formed from the signals of photoelectric conversion elements in a given quadrant, and an image formed from the signals of photoelectric conversion elements in another quadrant are points having different light beam angle components and constituting the same object. An image shift corresponding to a defocus amount is generated.

Further, refocus reconstruction processing will be explained. In FIG. 4, refocusing at the imaging distance r2 is to composite one point constituting the object (that is, the object A2) at the object distance a2 as one pixel. More specifically, the photoelectric conversion elements PD21a, PD22b, PD23c, PD24d, and PD25e are multiplied by a weighting coefficient corresponding to the imaging distance r2 and then added, obtaining the signal of a pixel 63 of a reconstructed image 42. The photoelectric conversion elements PD25a, PD25b, PD25c, PD25d, and PD25e weighted and added when obtaining the signal of the pixel 55 of the provisional reconstructed image 41 are used as pieces of information for constituting a plurality of different pixels at the imaging distance r2. As a result, the object A1 is displayed as an optically defocused object in the reconstructed image 42.

A weighting coefficient corresponding to an imaging distance will be explained. The weighting coefficient used in the first embodiment is a function depending on the imaging distance r by which the signal of a photoelectric conversion element is multiplied to obtain the signal of a pixel of a given reconstructed image. The length of a bar corresponding to a photoelectric conversion element, as shown on the right side of FIG. 4, represents the relative value of a weighting coefficient by which the signal of a photoelectric conversion element is multiplied. A weighting coefficient W55 is a coefficient by which the signal of each photoelectric conversion element is multiplied to obtain the signal of the pixel 55 of the reconstructed image 41 at the imaging distance r1. The signal of each photoelectric conversion element is multiplied by a weighting coefficient W63 to obtain the signal of the pixel 63 of the reconstructed image 42 at the imaging distance r2.

A general formula of refocus reconstruction processing calculation using the weighting coefficient is expressed as follows. For simplicity, refocus reconstruction processing calculation will be explained by giving attention to pixels arranged in one direction, the microlens arrays 2, and five elements arranged for every unit microlens array 2.

$$\begin{pmatrix} \vdots \\ s(m-1) \\ s(m) \\ s(m+1) \\ \vdots \end{pmatrix}_r = \begin{pmatrix} \ddots & \vdots & \vdots & \vdots & \vdots & \vdots & \cdot{}^{\cdot{}^{\cdot}} \\ \cdots & w_{m-1,a}(n) & w_{m-1,b}(n) & w_{m-1,c}(n) & w_{m-1,d}(n) & w_{m-1,e}(n) & \cdots \\ \cdots & w_{m,a}(n) & w_{m,b}(n) & w_{m,c}(n) & w_{m,d}(n) & w_{m,e}(n) & \cdots \\ \cdots & w_{m+1,a}(n) & w_{m+1,b}(n) & w_{m+1,c}(n) & w_{m+1,d}(n) & w_{m+1,e}(n) & \cdots \\ \cdot{}^{\cdot{}^{\cdot}} & \vdots & \vdots & \vdots & \vdots & \vdots & \ddots \end{pmatrix}_r \begin{pmatrix} \vdots \\ pd_a(n) \\ pd_b(n) \\ pd_c(n) \\ pd_d(n) \\ pd_e(n) \\ \vdots \end{pmatrix} \quad (2)$$

where S(m) is the signal value of the mth pixel of a reconstructed image, $pd_a(n)$ to $pd_e(n)$ are the signal values, constituting S(m), of photoelectric conversion elements below the nth microlens, and $w_{m,a}(n)$ to $w_{m,e}(n)$ are the weighting coefficients by which the signal values $pd_a(n)$ to $pd_e(n)$, constituting S(m), of the photoelectric conversion elements corresponding to the nth microlens are multiplied by a given imaging distance r. In general, m=n.

The weighting coefficient is determined by the imaging distance r, and a weighting coefficient corresponding to the imaging distance r can be held in advance. If not only principal light beams, but also other light beams are taken into consideration, and weighting addition of all relevant elements is calculated, an image can be reconstructed at higher accuracy. The foregoing is the description of refocus reconstruction processing.

Steps S308 to S314 of FIG. 3 will be explained again. The defective pixel detection unit 8 performs real-time defective pixel detection on the provisional reconstructed image recorded in step S307 of FIG. 3 (step S308).

The real-time defective pixel detection method according to the first embodiment may be a method of extracting, as a defect, a pixel having a large level difference from the average or median of surrounding pixels of the same color, that is, a pixel exceeding a threshold. As described in the description of Japanese Patent Laid-Open No. 2005-286825, this method may be developed to a method of extracting a defective pixel at a plurality of stages. For example, there is considered a method of not determining a defective pixel based on a threshold at an initial stage, but selecting and temporarily recording defective pixel candidates, and then widening the range of surrounding pixels to be compared for only the candidates. In the horizontal direction, it is sometimes easy to widen the range in this manner. However, in the vertical direction, widening of the range is directly linked to an increase in a line memory used in the image memory 10. Thus, caution is required for the relationship with cost. After that, a plurality of defective pixel addresses detected in step S308 of FIG. 3 are recorded in the volatile memory 16 (step S309).

The refocus reconstruction processing unit 7 generates a reconstructed image by performing refocus reconstruction processing at an imaging distance different from that of the provisional reconstructed image, and temporarily records the reconstructed image in the image memory 10 (step S310). The refocus reconstruction processing unit 7 sets a different imaging distance (for example, the imaging distance r2 in FIG. 4) so that a principal light beam entering each element is formed into an image.

Real-time defective pixel detection is performed on the reconstructed image having undergone the refocus reconstruction processing at the imaging distance different from that of the provisional reconstructed image (step S311). A plurality of detected defective pixel addresses are recorded in the volatile memory 16 (step S312).

As described above, the image processing apparatus in the image capturing apparatus according to the first embodiment performs defective pixel detection in the reconstructed image in steps S308 and S311 after performing refocus reconstruction processing. Hence, the image processing apparatus can avoid the difficult task of discriminating an object edge and a defective element which should be a correction target, in a captured image having different light beam angle components in respective quadrants.

The signal processing unit 9 refers to the defective pixel addresses recorded in the volatile memory 16 in steps S309 and S312, and extracts a defective element address in the captured image (step S313).

Figure 5:
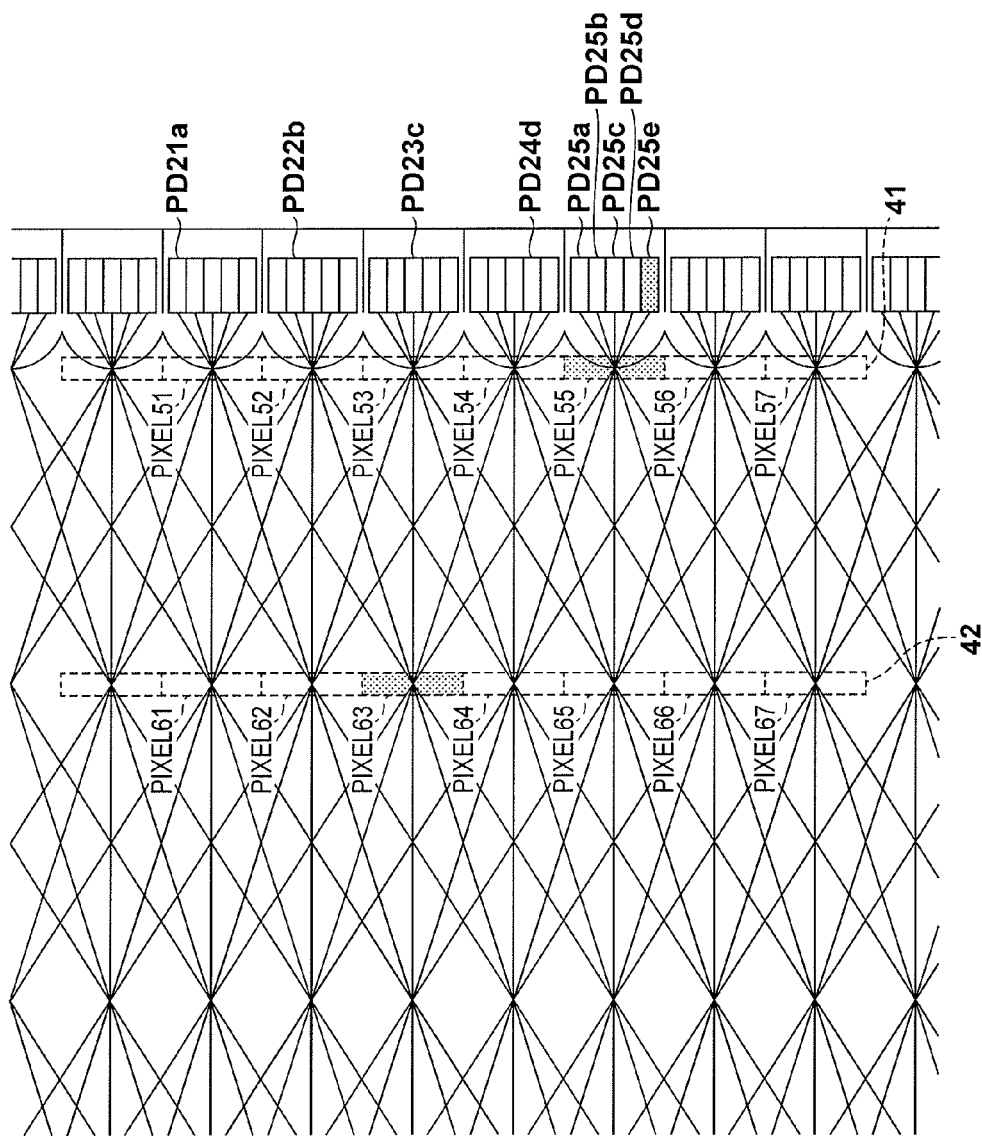
FIG. 5 is a light beam view for explaining defective element address extraction processing in the image capturing apparatus according to the first embodiment.

Extraction of a defective element address in step S313 will be explained in detail with reference to FIG. 5. FIG. 5 is a light beam view for explaining defective element address extraction processing. For simplicity, defective element address extraction processing will be explained by giving attention to pixels arranged in one direction, the microlens arrays 2, and five elements arranged for every unit microlens array 2.

The purpose of extracting a defective element address is to extract, by using defective pixel addresses detected from the reconstructed images 41 and 42, the signal of a photoelectric conversion element which generates a defective pixel in a captured image.

In FIG. 5, pixels 51, 52, 53, 54, 55, 56, and 57 are unit pixels constituting one refocused/reconstructed image 41. Pixels 61, 62, 63, 64, 65, 66, and 67 are unit pixels constituting one refocused/reconstructed image 42.

In FIG. 5, a case in which the pixel 63 of the reconstructed image 42 and the pixel 55 of the reconstructed image 41 are detected as defective pixels in real-time defective pixel detection will be exemplified. The defective pixel 55 is a signal obtained by weighting and adding the signals of the photoelectric conversion elements PD25a, PD25b, PD25c, PD25d, and PD25e by refocus reconstruction processing. The photoelectric conversion elements PD25a, PD25b, PD25c, PD25d, and PD25e are candidates of so-called defective elements (defective photoelectric conversion elements). Similarly, when attention is paid to the defective pixel 63, the photoelectric conversion elements PD21a, PD22b, PD23c, PD24d, and PD25e are also defective element candidates. In defective element address extraction processing, PD25e which is commonly listed in these defective element candidates is extracted as a defective element (defective element extraction).

It will be explained that the above-mentioned defective element can be logically extracted. First, assume that the signal of each pixel of a reconstructed image can be classified by real-time defective pixel detection into a defective pixel, or a pixel which is not a defect (to be referred to as a non-defective pixel hereinafter):

$$\text{pixel} \in \{\text{defective pixel, non-defective pixel}\} \quad (3)$$

Also, assume that the element of a captured image can be classified into a defective element, or an element which is not a defect (to be referred to as a non-defective element hereinafter):

$$\text{element} \in \{\text{defective element, non-defective element}\} \quad (4)$$

Here, assume that "a pixel obtained by adding signals including at least the signal of a defective element is detected as a defective pixel". That is, "a pixel obtained by adding the signals of only non-defective elements is detected as a non-defective pixel".

Since the pixel 51 is a non-defective pixel from the defective pixel detection result, $$\text{non-defective element} = PD21a \text{ and } PD21b \text{ and } PD21c \text{ and } PD21d \text{ and } PD21e \quad (5)$$

Since the pixel 52 is a non-defective pixel, $$\text{non-defective element} = PD22a \text{ and } PD22b \text{ and } PD22c \text{ and } PD22d \text{ and } PD22e \quad (6)$$

Since the pixel 53 is a non-defective pixel, $$\text{non-defective element} = PD23a \text{ and } PD23b \text{ and } PD23c \text{ and } PD23d \text{ and } PD23e \quad (7)$$

Since the pixel 54 is a non-defective pixel, $$\text{non-defective element} = PD24a \text{ and } PD24b \text{ and } PD24c \text{ and } PD24d \text{ and } PD24e \quad (8)$$

Since the pixel 55 is a defective pixel, $$\text{defective element} = PD25a \text{ or } PD25b \text{ or } PD25c \text{ or } PD25d \text{ or } PD25e \quad (9)$$

Since the pixel 63 is a defective pixel, $$\text{defective element} = PD21a \text{ or } PD22b \text{ or } PD23c \text{ or } PD24d \text{ or } PD25e \quad (10)$$

From equation (5), PD21a, PD21b, PD21c, PD21d, and PD21e are non-defective elements. Similarly, from equations (6), (7), and (8), PD22a, PD22b, PD22c, PD22d, PD22e, PD23a, PD23b, PD23c, PD23d, PD23e, PD24a, PD24b, PD24c, PD24d, and PD24e are non-defective elements. From equation (10), it is derived that PD25e is a defective element.

In this way, the signal processing unit 9 extracts a defective element address in a captured image by using defective pixel addresses recorded in the volatile memory 16. The foregoing is the description of defective element address extraction.

Finally, address data of each defective element extracted in step S313 of FIG. 3 is attached to the original captured image and recorded on the recording medium 12 (step S314). After that, the sequence in FIG. 3 ends.

In the flowchart of FIG. 3, steps S301 to S307 until a captured image is acquired, and steps S308 to S314 until a defective element address is extracted and recorded are shown as a sequence. However, the processes in step S308 and subsequent steps need not always be performed immediately after acquiring a captured image, and thus may be executed at another timing. The processes in step S308 and subsequent steps may be executed by a computer or the like using an image processing apparatus which imitates part of the image capturing apparatus in FIG. 1, a memory which records the image processing method, or the like. Defective pixel detection processing is performed using two reconstructed images having different imaging distances in the first embodiment, but may be performed using a larger number of reconstructed images.

Figure 6:
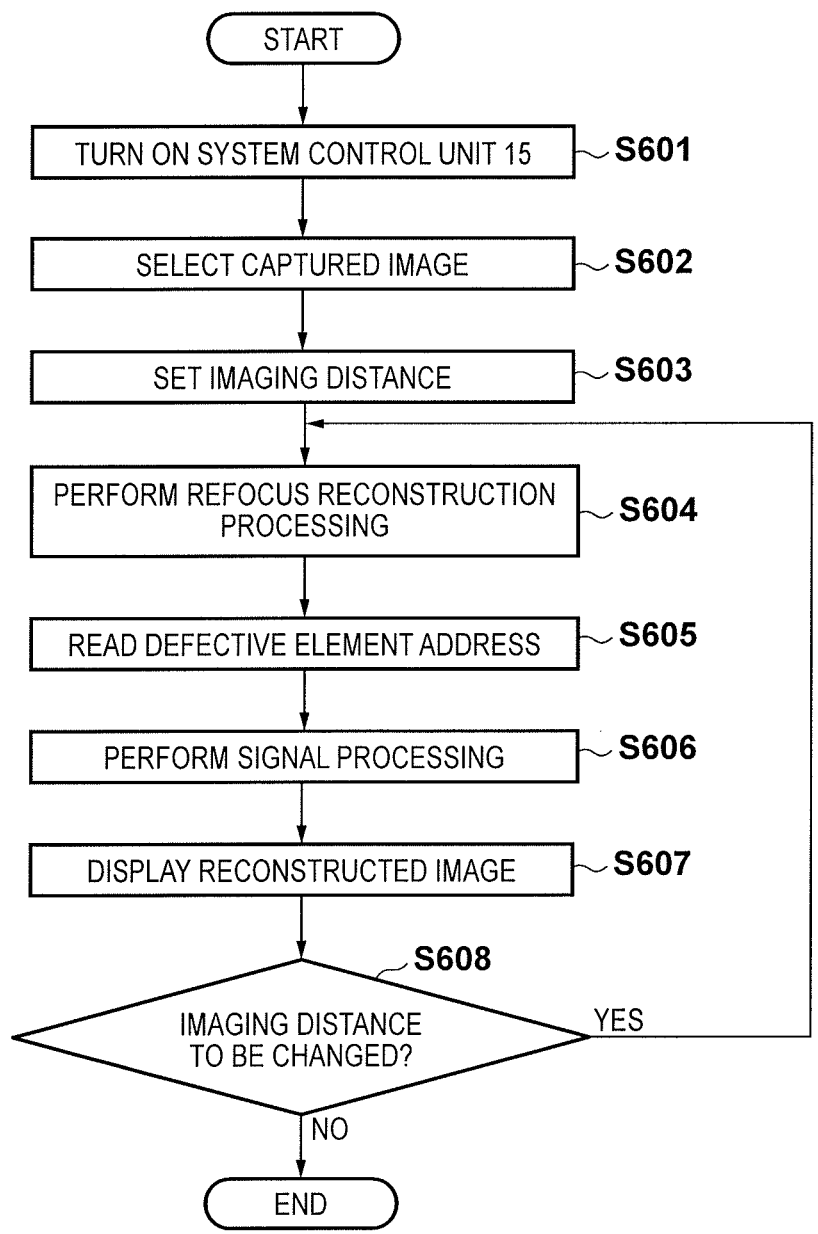
FIG. 6 is a flowchart showing a method of displaying a reconstructed image in the image capturing apparatus according to the first embodiment.

FIG. 6 is a flowchart showing a method of displaying a refocused/reconstructed image in the image capturing apparatus according to the first embodiment. According to the first embodiment, a reconstructed image in which degradation of the image quality accompanying a defective element is suppressed can be efficiently generated and displayed using address data of each defective element that is attached to a captured image and recorded.

First, the main power supply is turned on with a switch not shown in FIG. 1, and then the power supply of the system control unit 15 is turned on (step S601). The user selects an arbitrary captured image with an operation unit (not shown) (step S602). At this time, the system control unit 15 controls the display device 14 to display the provisional reconstructed image of a captured image that is recorded on the recording medium 12. Thus, the user can select the captured image.

While viewing the displayed provisional reconstructed image, the user selects an arbitrary object to be refocused on, thereby setting an imaging distance (step S603). The refocus reconstruction processing unit 7 generates a reconstructed image in accordance with the imaging distance set in step S603 (step S604).

The signal processing unit 9 reads defective element address data which is attached to the captured image and recorded on the recording medium 12 (step S605). The signal processing unit 9 converts the defective element address read in step S605 into an address corresponding to the imaging distance in the reconstructed image. Further, the signal processing unit 9 performs various signal processes such as correction processing at a pixel address corresponding to the defective pixel, white balance correction, and gamma correction (step S606).

The display circuit 13 causes the display device 14 to display the reconstructed image having undergone various signal processes in step S606 (step S607). If the user changes the imaging distance again, the process returns to the processing in step S604 to newly generate a reconstructed image and perform correction processing on a pixel regarding the defective element address (step S608).

According to the first embodiment, even when the imaging distance is changed and a reconstructed image is newly generated, a correction target pixel can be efficiently selected by referring to a defective element address attached to a captured image. The reconstructed image in which degradation of the image quality caused by a defective element is suppressed can be displayed quickly.

As a result, the sequence in FIG. 6 to perform reconstruction processing on a captured image at an arbitrary imaging distance selected by the user, and display a reconstructed image in which a pixel regarding a defective element is corrected ends.

The processing in FIG. 6 is executed inside the image capturing apparatus in the above description, but the embodiment of the present invention is not limited to this. For example, it is also possible to copy defective element address information-attached captured image data to a general image processing apparatus, and execute the processing in FIG. 6 by a computer in accordance with a program describing an image processing method. Even in this case, according to the present invention, a high-quality image in which a defective pixel is corrected can be displayed efficiently.

In the embodiment, a defective pixel is detected from pixels constituting a reconstructed image after refocus reconstruction processing, and corrected. Thus, the detection and correction functions can be implemented efficiently even for a defect such as RTS noise. However, a point defect which shines white and is generated permanently at the coordinates of a photoelectric conversion element can be managed as coordinates on the solid-state imaging sensor 3. When coordinate information of the defective element is recorded in a memory such as the ROM 17, interpolation processing may be performed on a captured image before performing refocus reconstruction processing premised on rearrangement, reconfiguration, and addition of the signals of photoelectric conversion elements. As the interpolation processing method, for example, interpolation may be performed using the signals of photoelectric conversion elements present in the same quadrant under different microlenses in consideration of the fact that a captured image includes light beam angle information.

Second Embodiment

In the second embodiment, a defective element extraction error is reduced by performing defective pixel detection processing on a larger number of reconstructed images.

Prior to a description of the second embodiment, it will be explained first that a defective element cannot be completely specified from only two reconstructed images, as in the first embodiment, and a defective element extraction error may occur.

Figure 7:
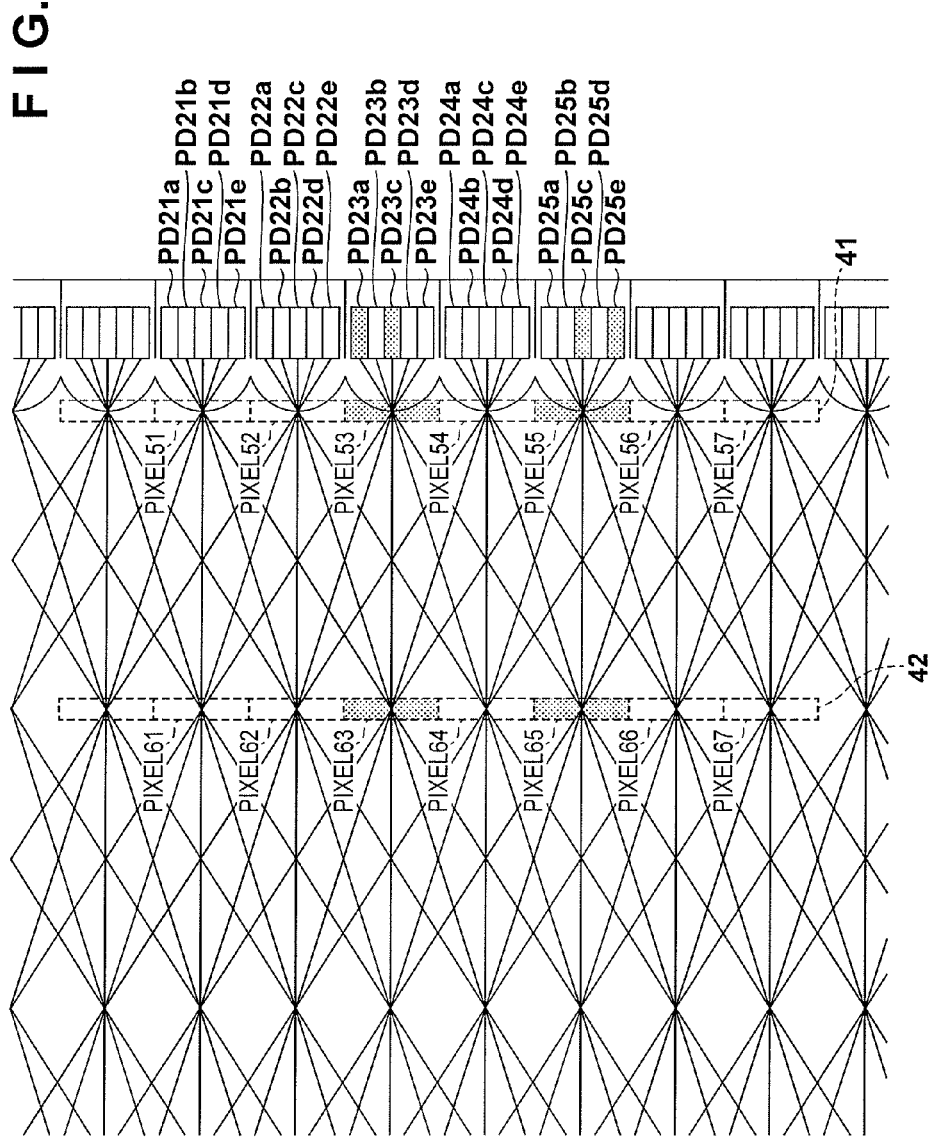
FIG. 7 is a light beam view for explaining defective element address extraction processing in the image capturing apparatus according to the first embodiment.

FIG. 7 is a light beam view for explaining defective element address extraction processing. For descriptive convenience, defective element address extraction processing will be explained by giving attention to pixels arranged in one direction, microlens arrays 2, and five elements arranged for every unit microlens array 2. In FIG. 7, pixels 53 and 55 of a reconstructed image 41, and pixels 63 and 65 of a reconstructed image 42 are pixels detected as defective pixels through real-time defective pixel detection steps S308 and S311 in FIG. 3.

In this case, according to the defective pixel extraction processing of the first embodiment, PD23a, PD23c, PD25c, and PD25e are extracted as defective elements. However, not all PD23a, PD23c, PD25c, and PD25e are defective elements in a situation in which defective pixels are detected, as shown in FIG. 7. For example, when defective elements are only the two photoelectric conversion elements PD23c and PD25c in FIG. 7, the pixels 63, 65, 53, and 55 should be detected as defective pixels on the assumption that "a pixel obtained by adding signals including at least the signal of a defective element is detected as a defective pixel". Further, for example, even when defective elements are only the two photoelectric conversion elements PD23a and PD25e in FIG. 7, the pixels 63, 65, 53, and 55 should be detected as defective pixels.

According to the defective pixel extraction method of the first embodiment, PD23a, PD23c, PD25c, and PD25e extracted as defective elements may be erroneously extracted in a situation in which defective pixels are detected, as shown in FIG. 7.

In the second embodiment, to solve the above-described problem, a defective element extraction error is reduced by performing defective pixel detection processing using a larger number of reconstructed images than in the first embodiment.

Figure 8:
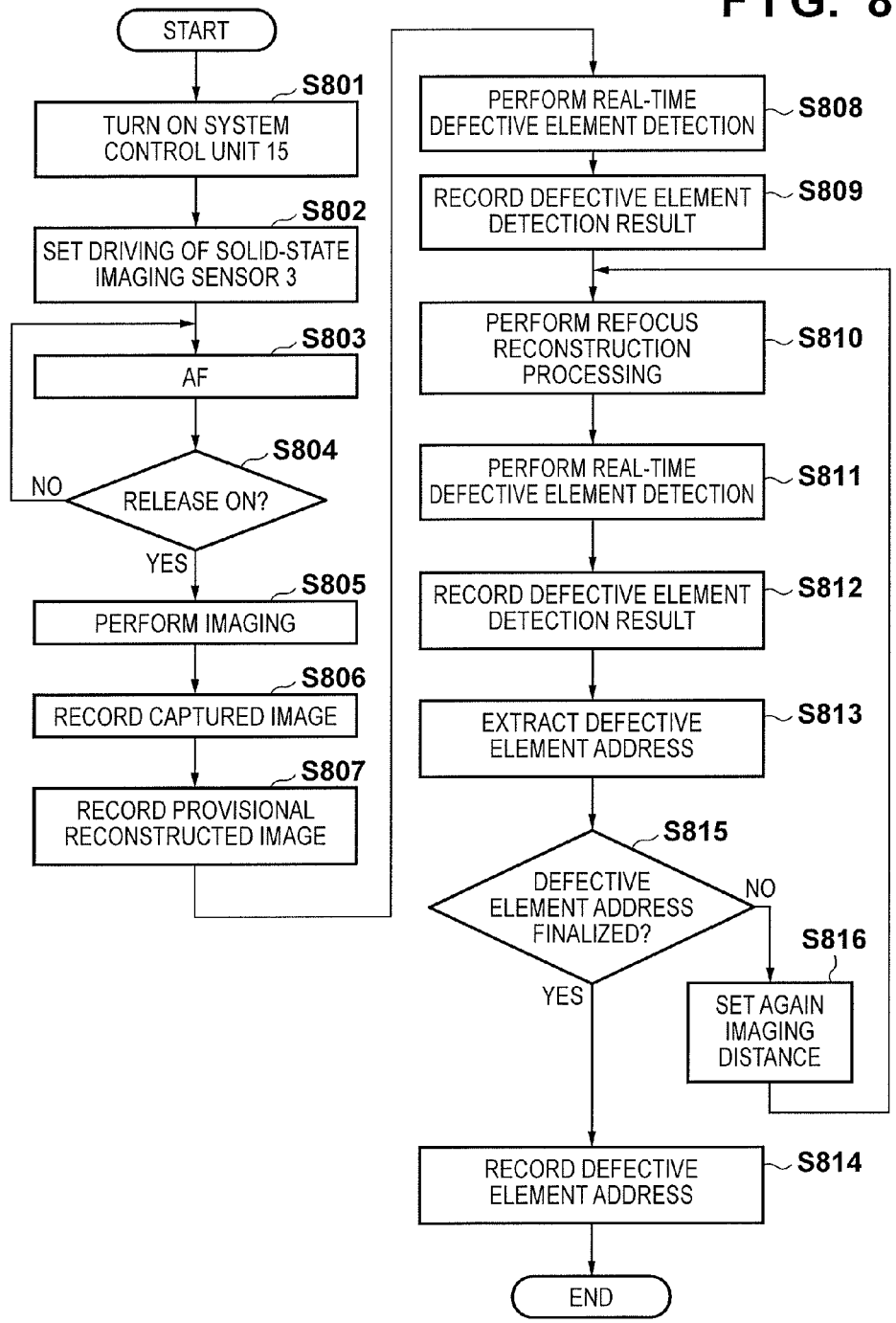
FIG. 8 is a flowchart showing a method of controlling an image capturing apparatus according to the second embodiment of the present invention.

FIG. 8 is a flowchart showing a method of controlling an image capturing apparatus according to the second embodiment. The second embodiment is different from the first embodiment in steps S815 and S816. In FIG. 8, processes in steps S801 to S813 are the same as those in steps S301 to S313 of FIG. 3 showing the first embodiment, and a detailed description thereof will not be repeated.

In the second embodiment, it is determined whether there is the possibility of an extraction error of a defective element address extracted in defective element address extraction processing (step S813) (step S815). In step S815, for example, if the number $p_{x-1}$ of defective elements extracted from (x−1) reconstructed images in defective element address extraction (step S813) is equal to the number $p_x$ of defective elements extracted from x reconstructed images through imaging distance re-setting (step S816) (that is, $p_x=p_{x-1}$), a defective element address can be finalized. However, at least x=3 or more reconstructed images are necessary.

If no defective element address has been finalized in step S815 (there is the possibility of an extraction error), an imaging distance is newly set again (step S816), and a refocused/reconstructed image is generated.

Figure 9:
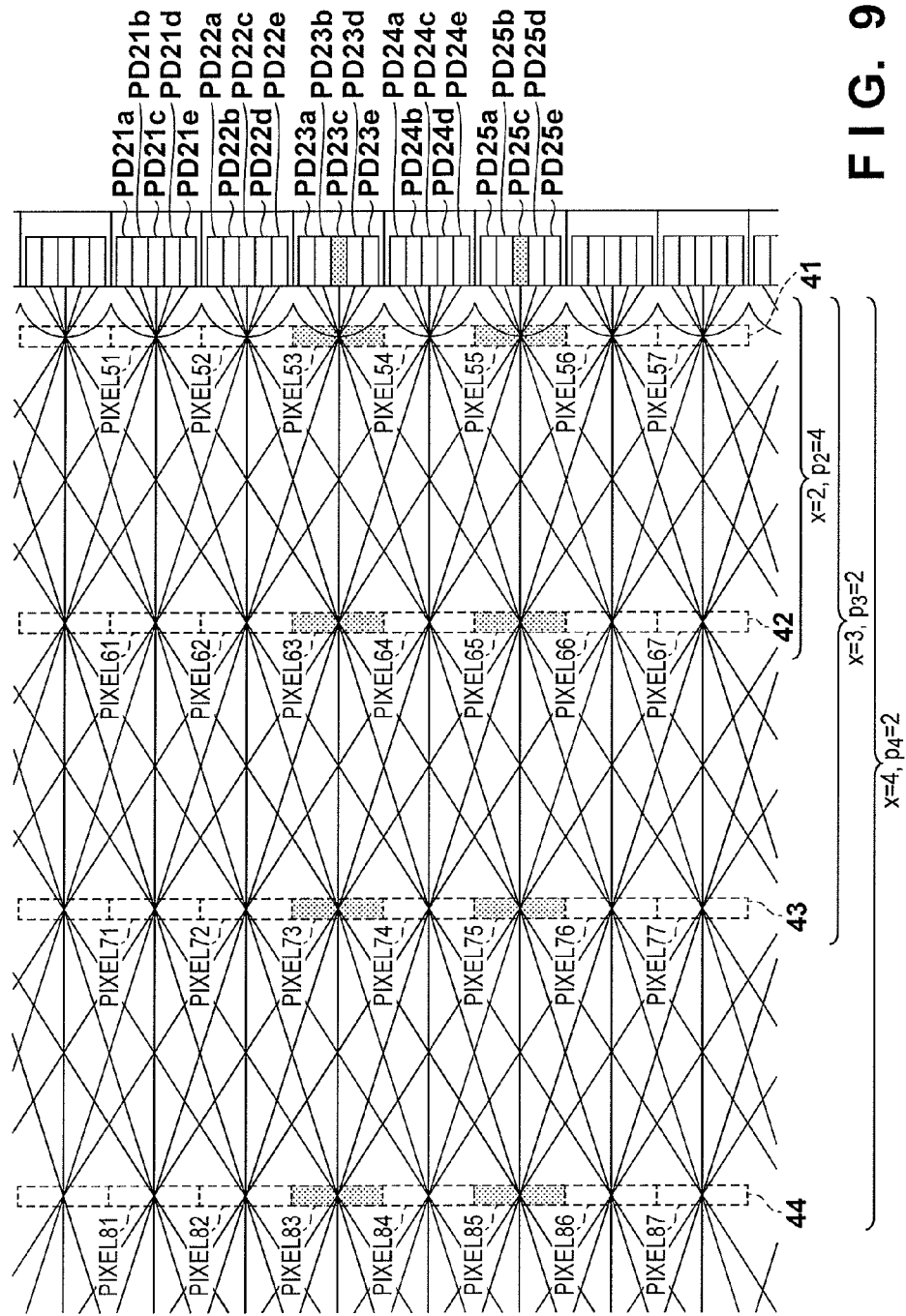
FIG. 9 is a light beam view for explaining defective element address extraction processing in the image capturing apparatus according to the second embodiment.

Defective element address extraction step S813 according to the second embodiment will be described with reference to FIG. 9. FIG. 9 is a light beam view for explaining defective element address extraction processing according to the second embodiment. For descriptive convenience, defective element address extraction processing will be explained by giving attention to pixels arranged in one direction, the microlens arrays 2, and five elements arranged for every unit microlens array 2.

In FIG. 9, the pixels 53 and 55 of the reconstructed image 41, and the pixels 63 and 65 of the reconstructed image 42 are pixels detected as defective pixels through real-time defective pixel detection steps S808 and S811.

Even in the second embodiment, as in the first embodiment, a defective element is extracted first by using defective pixel addresses detected from the reconstructed images 41 and 42. At this time, $P_2=4$ defective elements, that is, PD23a, PD23c, PD25c, and PD25e are extracted from x=2 reconstructed images, as described with reference to FIG. 7. As described above, a defective element cannot be completely specified from only x=2 reconstructed images, and a defective element may be erroneously extracted. In the second embodiment, it is determined in step S815 that a defective element address cannot be finalized. Then, a new refocused/reconstructed image 43 is generated through imaging distance re-setting (step S816). A refocus reconstruction processing unit 7 sets again a new imaging distance so that a principal light beam entering each element is formed into an image.

In FIG. 9, pixels 71, 72, 73, 74, 75, 76, and 77 represent unit pixels constituting one refocused/reconstructed image 43. The pixels 73 and 75 of the reconstructed image 43 are pixels detected as defective pixels through real-time defective pixel detection (step S811).

As is apparent from FIG. 9, PD23c and PD25c are extracted as defective elements by using the reconstructed images 41, 42, and 43. At this time, $p_3=2$ defective elements are detected from x=3 reconstructed images. Since $p_3 \neq p_2$, no defective element address is finalized. Thus, a new refocused/reconstructed image 44 is generated through imaging distance re-setting (step S816).

In FIG. 9, pixels 81, 82, 83, 84, 85, 86, and 87 represent unit pixels constituting one refocused/reconstructed image 44. The pixels 83 and 85 of the reconstructed image 44 are pixels detected as defective pixels through real-time defective pixel detection (step S811).

In FIG. 9, PD23c and PD25c are extracted as defective elements even by using the reconstructed images 41, 42, 43, and 44. At this time, $p_4=2$ defective elements are detected from x=4 reconstructed images. Since $p_4=p_3$, the addresses of PD23c and PD25c are finalized as defective element addresses.

If a defective element address is finalized in step S815 of FIG. 8, address data of each defective element is attached to the original captured image and recorded on a recording medium 12 (step S814). After that, the sequence in FIG. 8 ends.

Even in the second embodiment, when performing reconstruction processing on a captured image at an arbitrary imaging distance selected by the user, a reconstructed image in which degradation of the image quality accompanying a defective element is suppressed can be efficiently generated and displayed by performing the same processing as that in FIG. 6 showing the first embodiment. Further, according to the second embodiment, even when there is the possibility of an extraction error of the address of an extracted defective element, the extraction error can be reduced by newly generating a reconstructed image.

Third Embodiment

The first and second embodiments have described the fact that a defective element can be logically extracted from a real-time defective pixel detection result on the assumption that "a pixel obtained by adding signals including at least the signal of a defective element is detected as a defective pixel". However, it is readily considered that "a pixel obtained by adding signals including the signal of a defective element is not always detected as a defective pixel" in practice owing to various factors. Examples of these factors are optical shot noise, circuit noise of a solid-state imaging sensor, the output signal intensity and imaging distance of a defective element, and a detection error and no detection in real-time defective pixel detection.

The third embodiment will explain a method of appropriately extracting a defective element from a plurality of reconstructed images without specifying a defective element by real-time defective pixel detection. In the third embodiment, a defective element can be more appropriately extracted by obtaining a weighting coefficient used to generate a reconstructed image, and the signal level of a defective pixel in processing of extracting a defective element address.

FIG. 10 is a flowchart showing a method of controlling an image capturing apparatus according to the third embodiment. In FIG. 10, processes in steps S1001 to S1007 are the same as those in steps S301 to S307 of FIG. 3 in the first embodiment, and a detailed description thereof will not be repeated.

In steps S1008 to S1015, processing of extracting a defective element in a recorded captured image and recording the address of the defective element is performed. However, steps S1008 to S1015 are a kind of preparation processing for, when the user views a reconstructed image, efficiently displaying a reconstructed image in which degradation of the image quality accompanying a defective element is suppressed. Hence, the processes in step S1008 and subsequent steps need not always be performed immediately after acquiring a captured image, as in the first embodiment. The processes in step S1008 and subsequent steps may be executed by a computer or the like using an image processing apparatus which imitates part of the image capturing apparatus in FIG. 1, a memory which records the image processing method, or the like.

The processes in step S1008 and subsequent steps in FIG. 10 will be explained. In the following description, these processes will be explained by giving attention to pixels arranged in one direction, microlens arrays 2, and five elements arranged for every unit microlens array 2 for descriptive convenience.

A refocus reconstruction processing unit 7 sets an imaging distance r=r0 for a captured image recorded on a recording medium 12 (step S1008), generates a reconstructed image by refocus reconstruction processing, and records it in an image memory 10 (step S1009).

Thereafter, a defective pixel detection unit 8 calculates a defective pixel signal level $S_{RT}$ for each pixel from the reconstructed image recorded in the image memory 10 (step S1010). In the first or second embodiment, as for a pixel of interest in a reconstructed image, the defective pixel detection unit 8 detects a defective pixel address according to the method of extracting, as a defect, a pixel having a large level difference from the average or median of surrounding pixels of the same color, that is, a pixel exceeding a threshold. In the third embodiment, however, the defective pixel detection unit 8 has a feature in which the difference between a signal level S(m) of the mth pixel of a reconstructed image and an average signal level $S_{area}(m)$ of surrounding pixels (vicinity pixels) of the same color is obtained as a defective pixel signal level $S_{RT}(m)$ for each pixel:

$$S_{RT}(m) = S_{area}(m) - S(m) \quad (11)$$

In this case, the defective pixel signal level $S_{RT}(m)$ obtained for each pixel in a reconstructed image having the imaging distance r is represented by $S_{RT,r}$:

$$S_{RT,r} = \begin{pmatrix} \vdots \\ s_{RT}(m-1) \\ s_{RT}(m) \\ s_{RT}(m+1) \\ \vdots \end{pmatrix}_r \quad (12)$$

Then, the defective pixel detection unit 8 records the calculated $S_{RT,r}$ in a volatile memory 16 (step S1011).

The number x of reconstructed images for which the defective pixel signal level has been calculated and recorded is checked. If x<5, the process returns to step S1008 to repeat the processes in steps S1008 to S1011.

Every time the processes are repeated, the refocus reconstruction processing unit 7 sets again a different imaging distance r (step S1008). The refocus reconstruction processing unit 7 selects a different imaging distance (for example, an imaging distance r1 or r2 in FIG. 4) so that a principal light beam entering each element is formed into an image. In the third embodiment, r=r0, r1, r2, r3, r4 are set as the imaging distance r, and refocused/reconstructed images are generated (step S1009).

By repeating steps S1008 to S1012 five times, $S_{RT,r0}$, $S_{RT,r1}$, $S_{RT,r2}$, $S_{RT,r3}$, and $S_{RT,r4}$ corresponding to r=r0, r1, r2, r3, r4 are recorded in the volatile memory 16 (step S1011).

If the number x of reconstructed images for which the defective pixel signal level has been calculated and recorded becomes x=5, a defective element signal level k is calculated (step S1013). A method of calculating the defective element signal level k for each element will be described with reference to equations (13) to (23). Here, respective matrices in equation (2) expressing a general formula of refocus reconstruction processing calculation at the imaging distance r are given by:

$$S_r = \begin{pmatrix} \vdots \\ s(m-1) \\ s(m) \\ s(m+1) \\ \vdots \end{pmatrix}_r \quad (13)$$

$$W_r = \quad (14)$$

$$\begin{pmatrix} \ddots & \vdots & \vdots & \vdots & \vdots & \vdots & \ddots \\ \cdots & w_{m-1,a}(n) & w_{m-1,b}(n) & w_{m-1,c}(n) & w_{m-1,d}(n) & w_{m-1,e}(n) & \cdots \\ \cdots & w_{m,a}(n) & w_{m,b}(n) & w_{m,c}(n) & w_{m,d}(n) & w_{m,e}(n) & \cdots \\ \cdots & w_{m+1,a}(n) & w_{m+1,b}(n) & w_{m+1,c}(n) & w_{m+1,d}(n) & w_{m+1,e}(n) & \cdots \\ \ddots & \vdots & \vdots & \vdots & \vdots & \vdots & \ddots \end{pmatrix}_r$$

$$PD = \begin{pmatrix} \vdots \\ pd_a(n) \\ pd_b(n) \\ pd_c(n) \\ pd_d(n) \\ pd_e(n) \\ \vdots \end{pmatrix} \quad (15)$$

where, as described in the first embodiment, S(m) is the signal value of the mth pixel of a reconstructed image, $pd_a(n)$ to $pd_e(n)$ are the signal values, constituting S(m), of photoelectric conversion elements below the nth microlens, and $w_{m,a}(n)$ to $w_{m,e}(n)$ are the weighting coefficients by which the signal values $pd_a(n)$ to $pd_e(n)$, constituting S(m), of the photoelectric conversion elements corresponding to the nth microlens are multiplied by a given imaging distance r.

The defective element signal level k for each element is calculated using $S_{RT,r0}$, $S_{RT,r1}$, $S_{RT,r2}$, $S_{RT,r3}$, and $S_{RT,r4}$ recorded in the volatile memory 16, and $(W_{r0}+W_{r1}+W_{r2}+W_{r3}+W_{r4})^{-1}$:

$$\begin{pmatrix} \vdots \\ k_a(n) \\ k_b(n) \\ k_c(n) \\ k_d(n) \\ k_e(n) \\ \vdots \end{pmatrix} = (W_{r0}+W_{r1}+W_{r2}+W_{r3}+W_{r4})^{-1} \cdot \quad (16)$$

$$(S_{RT,r0}+S_{RT,r1}+S_{RT,r2}+S_{RT,r3}+S_{RT,r4})$$

If the imaging distance r=r0, r1, r2, r3, r4 used to calculate a defective pixel signal level are determined, $(W_{r0}+W_{r1}+W_{r2}+W_{r3}+W_{r4})^{-1}$ can be calculated in advance by using $W_{r0}$, $W_{r1}$, $W_{r2}$, $W_{r3}$, and $W_{r4}$ and recorded in a nonvolatile memory 17 or the like.

By using equations (13) to (15), refocus reconstruction processing calculation at the imaging distance r=r0, r1, r2, r3, r4 are given by:

$$S_{r1} = W_{r0} \cdot PD \quad (17)$$

$$S_{r1} = W_{r1} \cdot PD \quad (18)$$

$$S_{r2} = W_{r2} \cdot PD \quad (19)$$

$$S_{r1} = W_{r3} \cdot PD \quad (20)$$

$$S_{r4} = W_{r4} \cdot PD \quad (21)$$

From equations (17) to (21), equation (22) is derived based on the partition law:

$$S_{r0}+S_{r1}+S_{r2}+S_{r3}+S_{r4}(W_{r0}+W_{r1}+W_{r2}+W_{r3}+W_{r4}) \cdot PD \quad (22)$$

From equation (22), the inverse matrix $(W_{r0}+W_{r1}+W_{r2}+W_{r3}+W_{r4})^{-1}$ of $(W_{r0}+W_{r1}+W_{r2}+W_{r3}+W_{r4})$ satisfies equation (23):

$$PD = (W_{r0}+W_{r1}+W_{r2}+W_{r3}+W_{r4})^{-1} \cdot (S_{r0}+S_{r1}+S_{r2}+S_{r3}+S_{r4}) \quad (23)$$

Equation (23) indicates that, if all images reconstructed at the imaging distance r=r0, r1, r2, r3, r4 are added and the sum is multiplied by $(W_{r0}+W_{r1}+W_{r2}+W_{r3}+W_{r4})^{-1}$, the value is inversely transformed into the signal value of each photoelectric conversion element in the original captured image. That is, equation (16) indicates that a signal value inversely transformed by adding, for each pixel, all defective pixel signal levels $S_{RT}(m)$ obtained from images reconstructed at the imaging distance r=r0, r1, r2, r3, r4, and multiplying the sum by $(W_{r0}+W_{r1}+W_{r2}+W_{r3}+W_{r4})^{-1}$ is obtained as the defective element signal level k for each element. The foregoing is the description of the defective element signal level k.

In the third embodiment, a photoelectric conversion element in which the defective element determination value k exceeds a threshold Th is extracted as a defective element (step S1014). The threshold Th is experimentally obtained. Finally, a signal processing unit 9 attaches, to the original captured image, address data of the defective element extracted in step S1014, and records it on the recording medium 12.

Even in the third embodiment, when performing reconstruction processing on a captured image at an arbitrary imaging distance selected by the user, a reconstructed image in which degradation of the image quality accompanying a defective element is suppressed can be efficiently generated and displayed by performing the same processing as that in FIG. 6 according to the first embodiment.

In the description of the third embodiment, the number of reconstructed images for calculating the defective pixel signal level $S_{RT,r}$ is x=5. This is because five elements are arranged for every unit microlens array 2 for descriptive convenience in the embodiment. In practice, the number x of reconstructed images is appropriately set depending on the number of elements arranged for every unit microlens array 2.

For example, when the number of elements arranged for every unit microlens array 2 is x0, the embodiment is established at least x=x0 as long as the refocus reconstruction processing unit 7 generates a reconstructed image at each different imaging distance (for example, the imaging distance r1 or r2 in FIG. 4) so that a principal light beam entering each element is formed into an image. In other words, when the number of elements arranged for every unit microlens array 2 is x0, at least the inverse matrix $(W_{r0}+W_{r1}+W_{r2}+\ldots+W_{rx0})^{-1}$ of $(W_{r0}+W_{r1}+W_{r2}+\ldots+W_{rx0})$ exists for the different imaging distances r=r0, r1, r2, ..., rx0 which are set so that a principal light beam entering each element is formed into an image.

In the third embodiment, as in the first and second embodiments, a defective element is extracted using a plurality of reconstructed images. Real-time defective pixel detection performed on a reconstructed image, which has been proposed in the first or second embodiment, is processing of comparing the signal level of a pixel of interest in a reconstructed image with the average signal level of surrounding pixels, and determining whether the pixel of interest is a defective pixel or a non-defective pixel. In the first or second embodiment, a defective pixel is determined based on a threshold using the defective pixel signal level $S_{RT}(m)$ in the third embodiment.

To the contrary, in the third embodiment, the differences between the signal levels of pixels of interest in a plurality of reconstructed images, and the average signal levels of surrounding pixels are held as values without change, and are used to extract a defective element.

In the third embodiment, no defective pixel is specified in a plurality of reconstructed images by real-time defective pixel detection. Therefore, a defective element can be appropriately extracted even when "a pixel obtained by adding signals including the signal of a defective element is not always detected as a defective pixel" in practice owing to various factors such as optical shot noise, circuit noise of a solid-state imaging sensor, the output signal intensity and imaging distance of a defective element, and a detection error and no detection in real-time defective pixel detection.

According to the present invention, an image processing apparatus capable of efficiently obtaining a refocused/reconstructed image in which degradation of the image quality accompanying a defective element is suppressed can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-189848, filed Sep. 12, 2013, which is hereby incorporated by reference herein in its entirety.

What is claimed is:

1. An image processing apparatus which processes a captured image including angle information of a light beam traveling from the object, comprising:
a generation unit configured to generate a reconstructed image by reconstructing the captured image;
an extraction unit configured to extract an address of a defective photoelectric conversion element which is included in photoelectric conversion elements which captured the captured image based on a plurality of reconstructed images corresponding to different imaging distances.

2. The apparatus according to claim 1, further comprising a detection unit configured to detect a defective pixel in the plurality of reconstructed images, wherein said extraction unit extracts the address of the defective photoelectric conversion element based on the defective pixel.

3. The apparatus according to claim 2, wherein said detection unit detects the defective pixel by comparing a signal of a target pixel in the reconstructed image with signals of a plurality of pixels in the vicinity of the target pixel.

4. The apparatus according to claim 2, wherein said extraction unit extracts candidates of the defective photoelectric conversion element based on the address of the defective pixel in the reconstructed image and a reconstruction process applied to the reconstructed image, and determines the defective photoelectric conversion element based on a plurality of candidates of the defective photoelectric conversion element in each of the plurality of reconstructed images corresponding to different imaging distances.

5. The apparatus according to claim 1, further comprising a correction unit configured to correct the defective pixel in the reconstructed image generated by said generation unit based on information of the address of the defective photoelectric conversion element.

6. The apparatus according to claim 1, further comprising a recording unit configured to record the address of the defective photoelectric conversion element together with the captured image.

7. The apparatus according to claim 1, said generation unit generates the reconstructed image by relocating and adding each signal of the captures image in accordance with the imaging distance.

8. A method of controlling an image processing apparatus which processes a captured image including angle information of a light beam traveling from the object, comprising:
a generation step of generating a reconstructed image by reconstructing the captured image;
an extraction step of extracting an address of a defective photoelectric conversion element which is included in photoelectric conversion elements which captured the captured image based on a plurality of reconstructed images corresponding to different imaging distances.

* * * * *